Dec. 25, 1945.  R. G. TURNER  2,391,602
CONVERTIBLE WEFT REPLENISHING LOOM
Original Filed July 21, 1941   6 Sheets-Sheet 1

INVENTOR
RICHARD G. TURNER
Chas. J. Hawley
ATTORNEY

Dec. 25, 1945.  R. G. TURNER  2,391,602
CONVERTIBLE WEFT REPLENISHING LOOM
Original Filed July 21, 1941  6 Sheets-Sheet 4

INVENTOR
RICHARD G. TURNER
Chas. T. Hawley
ATTORNEY

Dec. 25, 1945. R. G. TURNER 2,391,602
CONVERTIBLE WEFT REPLENISHING LOOM
Original Filed July 21, 1941 6 Sheets-Sheet 5

FIG. 5

INVENTOR
RICHARD G. TURNER
Chas. J. Hawley
ATTORNEY.

Patented Dec. 25, 1945

2,391,602

UNITED STATES PATENT OFFICE 2,391,602

CONVERTIBLE WEFT REPLENISHING LOOM

Richard G. Turner, Worcester, Mass., assignor to Crompton & Knowles Loom Works, Worcester, Mass., a corporation of Massachusetts Original application July 21, 1941, Serial No. 403,326, now Patent No. 2,360,529, dated October 17, 1944. Divided and this application June 3, 1944, Serial No. 538,604

5 Claims. (Cl. 139—232)

This application is a division of my co-pending application Serial No. 403,326, filed July 21, 1941, now Patent No. 2,360,529.

This invention relates to a loom so constructed that it can be used either for automatic weaving with diverse colors in the weft, automatic weaving for mixing wefts of the same color, or non-automatic pick and pick weaving with four or more shuttle boxes on each side of the loom.

It has been customary heretofore to employ a stationary magazine having several vertical stacks of reserve bobbins for transfer into any one of several distinctive weaving shuttles. Looms of this type ordinarily employ shifting shuttle boxes on one side only of the loom. It has also been proposed heretofore to use a rotary magazine having reserve bobbins all of the same color on a pick and pick filling mixing loom employing shifting shuttle boxes at the magazine end in addition to other boxes at the opposite end of the loom.

When the magazine with diverse colors is used it is in relatively low position with respect to the lay, but must be relatively high when used in automatic pick and pick weaving to accommodate the up motion of the shuttle boxes under it. It is an important object of my present invention to provide means for setting the stationary magazine either in low or high position and connected so that it can function as a replenishing mechanism in either position, whether the loom be running with diverse wefts or pick and pick.

Included in the construction of the stationary magazine are vertical slides and a selector for them operating to release a bobbin from any selected stack. The selector is controlled in part by the weft detector with the aid of a constantly rotating cam. It is another object of my present invention to provide two cams which are interchangeable to operate the magazine and weft detector, one cam for use with diverse wefts and the other for the single color weft used when mixing filling.

Automatic looms weaving with diverse colors complete their cycle of operations with the aid of a cam having a complete rotation in two successive picks of the loom. In filling mixing pick and pick weaving, however, the sequence of box movements at the magazine end is such as to require four consecutive picks for a complete cycle, the boxes being up for two picks and then down the following two picks. It is a further object of my present invention to provide controls for the automatic features of the loom which will permit replenishment in the pick and pick filling mixing setting when the boxes are up during the first pair of picks of the four-pick cycle, but prevent such operation during the second pair of the picks of the cycle when the boxes are down. This may conveniently be accomplished by locking the feeler against action during the second pair of picks, thus enabling the magazine to be used for automatic filling mixing although controlled by a cam which completes its cycle of operations in two picks.

It is another object of my present invention to provide a control for the magazine selector which operates to shift the selector so that successive transfers will involve bobbins derived from different stacks so that a mixing of the weft will be effected at the magazine. The controller for the selector is operated by the transfer mechanism at a time when the cam used for the pick and pick filling mixing setting is holding certain parts of the magazine stationary by means of the dwell on it.

Another feature of my invention relates to the mounting for the magazine whereby the latter can be held in two different vertical positions the distance between which is substantially the distance between the two shuttle boxes under the magazine used for pick and pick filling mixing. This feature involves a pair of interchangeable magazine supports and also braces for the top of the magazine which are equally effective to hold the upper part of the magazine whether the same be in high or low position.

A feature of the supports is that the one employed for the low setting of the magazine serves as a mounting for the shuttle position detector which revokes an initiated transfer if the shuttle be improperly positioned to receive the reserve bobbin. The support for the magazine in high position has no provision for mounting the shuttle position detector and there is no possibility that this detector can be used when weaving pick and pick filling mixing. There is no possibility therefore that the detector will be damaged by the shifting of the shuttle boxes.

In order to facilitate the description which follows the loom will be referred to as having several settings, the 4 x 1 setting corresponding to that employing diverse wefts with the magazine in low position, the 4 x 2 setting corresponding to the magazine in high position when a series of shuttles follow each other in a definite rotation for mixing filling in pick and pick weaving, and a 4 x 4 setting referring to the non-automatic arrangement wherein four shuttle boxes at each side of the loom can become active for weaving pick and pick non-automatic with any number of shuttles up to seven.

With these and other detailed objects which will be pointed out as the description proceeds, my invention resides in the combination and arrangement of parts hereinafter described and set forth.

In the accompanying drawings, wherein a convenient embodiment of my invention is set forth, Fig. 4, Figs. 10 and 11 are diagrammatic views looking in the direction of arrow 10, Fig. 1, showing the actuator lever operating cams for the 4 x 1 and 4 x 2 settings, respectively, of the loom.

*General loom construction*

Figures 1, 6:
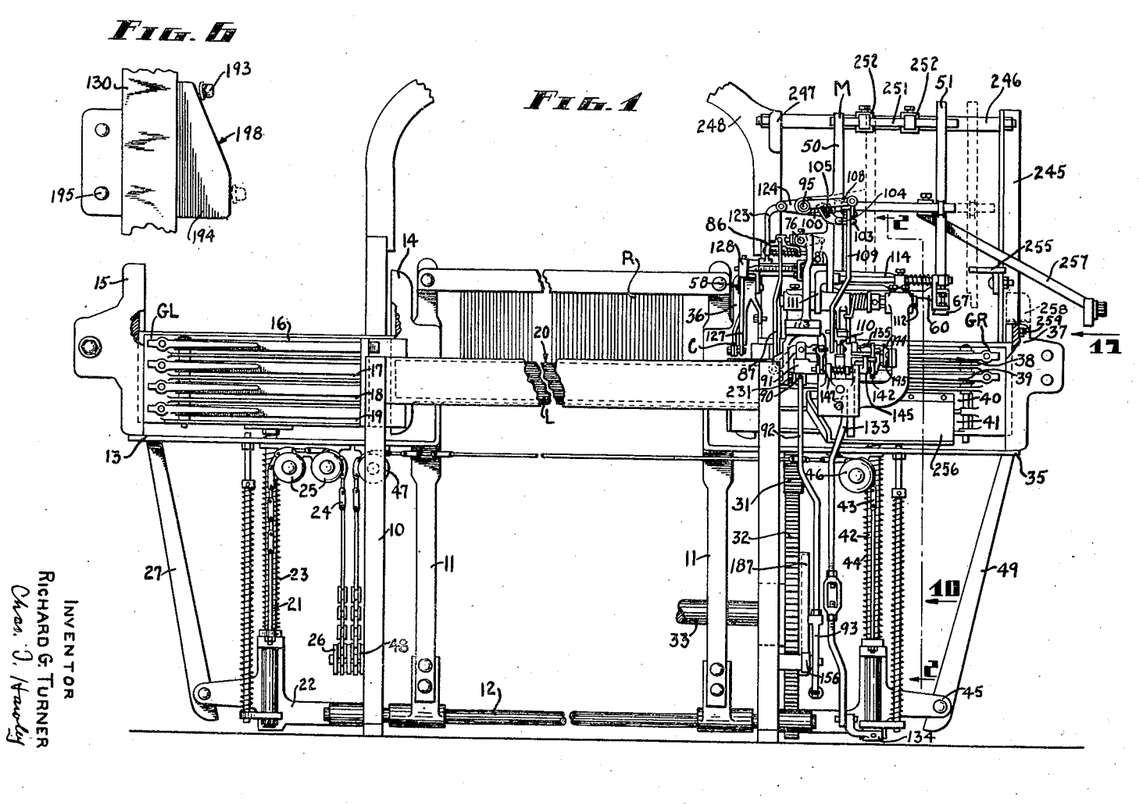
Fig. 1 is a front elevation of a portion of a loom having my invention applied thereto, the magazine being in the 4 x 2 setting.
Fig. 6 is a detailed end elevation looking in the direction of arrow 6, Fig. 5, and showing the locking control for the weft detector.

Referring particularly to Fig. 1, loom frame 10 lay L, lay swords 11 rocker shaft 12 and reed R are of usual construction. A lay end 13 at the left of Fig. 1 has inner and outer box guides 14 and 15, respectively, for a gang GL of vertically shifting shuttle boxes having four cells 16, 17, 18 and 19 each of which can be moved to active position in alignment with the shuttle race 20. A box lifter rod 21 guided in a rocker foot 22 on shaft 12 is raised against the action of spring 23 around it by a chain 24 trained over lay carried pulleys 25 and also under a pulley 26, from whence the chain leads to any approved form of box operating mechanism not shown, such as that used in the so-called Knowles head. The picker stick 27 pivoted to the rocker foot 22 is operated preferably on alternate beats of the loom.

Figure 2:
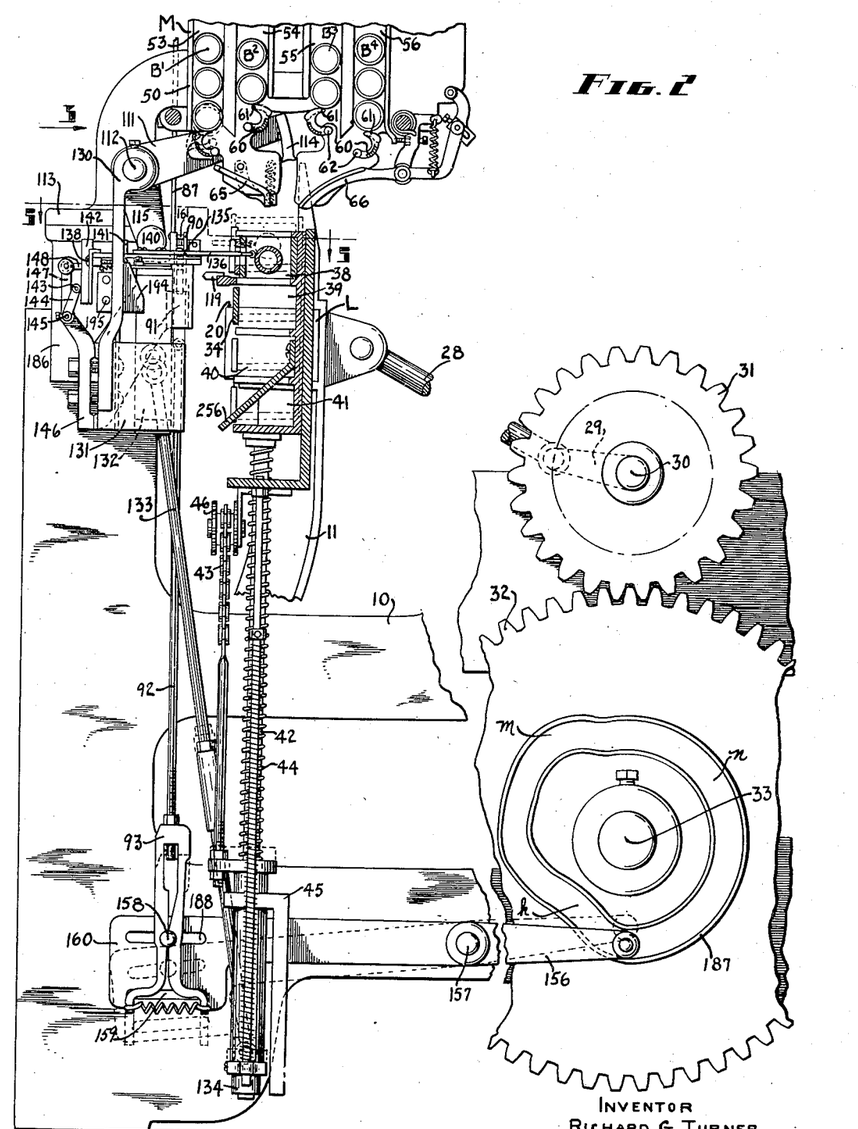
Fig. 2 is a vertical section on line 2—2 of Fig. 1 on an enlarged scale.

The lay is reciprocated by connectors 28, one of which is shown in Fig. 2, attached to the wrist 29 of a top or crank shaft 30 to which is secured a gear 31 meshing with a gear 32 of twice its diameter mounted on the bottom shaft 33. Top shaft 30 therefore turns twice as fast as the bottom shaft and the latter has one rotation for each pair of successive picks.

At its right end the lay has a lay end 35 having inner and outer box guides 36 and 37, respectively, to guide a gang of boxes GR having in the present instance upper and lower cells 38 and 39, each with a binder 34 which constitute an active pair of boxes, and having also other lower cells 40 and 41 which will not ordinarily be active when the loom is arranged for automatic replenishment. Gang GR is mounted on a box lifter rod 42 and is raised by a chain 43 against the action of a spring 44 surrounding it and acting in the usual manner to lower the boxes. The rod 42 extends through a rocker foot 45 on the rocker shaft 12 and chain 43 is fastened to rod 42 and trained over lay carried pulleys 46 and 47 and under a pulley 48 concentric with pulley 26 and then leads to the box operating mechanism. A picker stick 49 pivoted on foot 45 has a working stroke on those beats of the loom on which picker stick 27 is inactive.

The gangs GL and GR are movable with respect to the lay independently of each other so that any shuttle box at either end of the lay can become active when the loom is weaving non-automatically pick and pick, and either of cells 38 or 39 may be active when weaving automatically pick and pick. Except as indicated hereinafter that part of the loom already described is constructed and operated in the usual manner.

*Multi-cell magazine*

The weft replenishing mechanism includes a reserve bobbin magazine M similar to that customarily employed on automatic multicolor looms, and is operative to release a reserve bobbin and transfer it into a depleted shuttle, whether in the 4 x 1 or 4 x 2 setting. The magazine has an inner plate 50 formed in the present instance with four vertical guideways 53, 54, 55 and 56 which hold the heads of four stacks of reserve bobbins B', B2, B3 and B4, respectively. An outer plate 51 is formed with guides 52 for the tip ends of the reserve bobbins.

At the bottom of each stack of reserve bobbins is located a normally empty cradle 60 having a nose 61 which supports the bobbins above it, and a pin 62 to hold a bobbin in the cradle. The usual position of the cradles is shown in full lines in Fig. 2 and in dotted lines in Fig. 8. When a cradle rocks from normal to bobbin receiving position, that is, from the dotted to the full line position shown in Fig. 8, the corresponding stack of bobbins will descend and the lowest bobbin in it will enter the cradle to be supported by pin 62. When the latter is rocked back to its normal position pin 62 will descend and nose 61 will move the bobbin toward transfer position.

Figure 3:
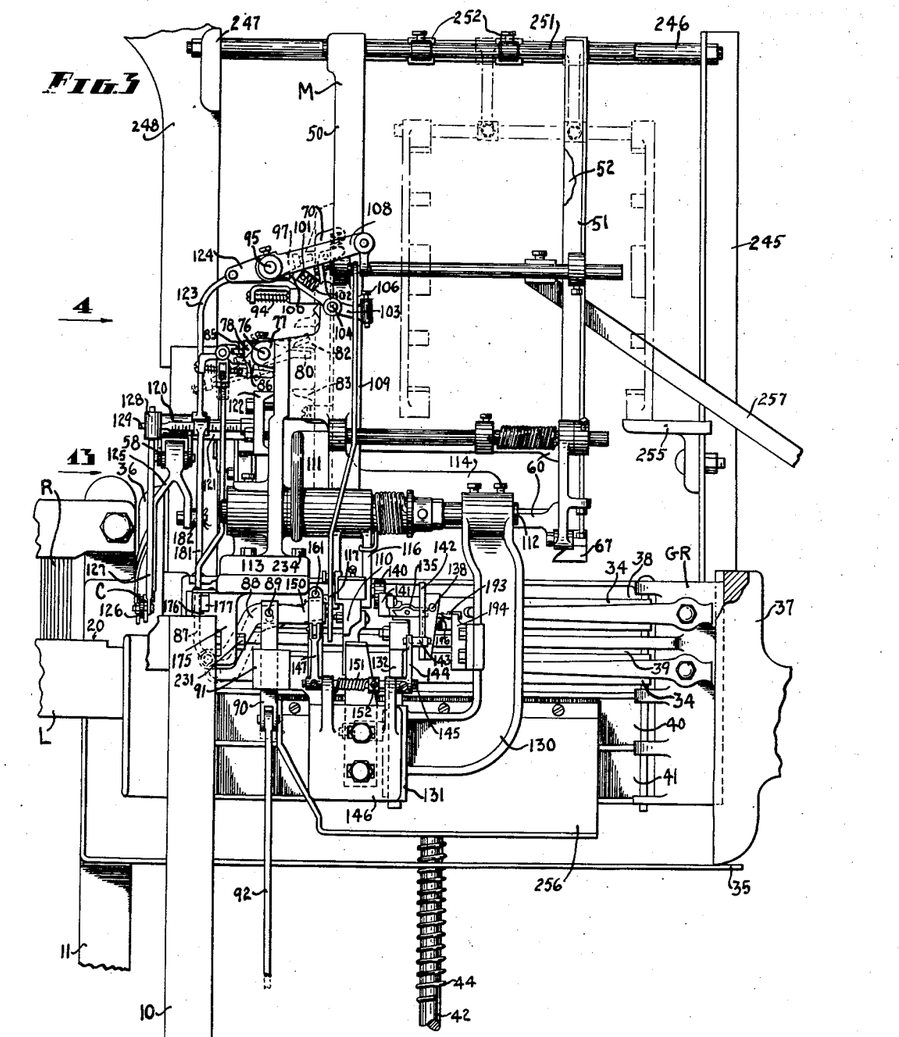
Fig. 3 is a front elevation of a portion of the structure shown in Fig. 2 and looking in the direction of arrow 3, Fig. 2, but showing the magazine in the 4 x 1 setting.
Figures 4, 7, 8:
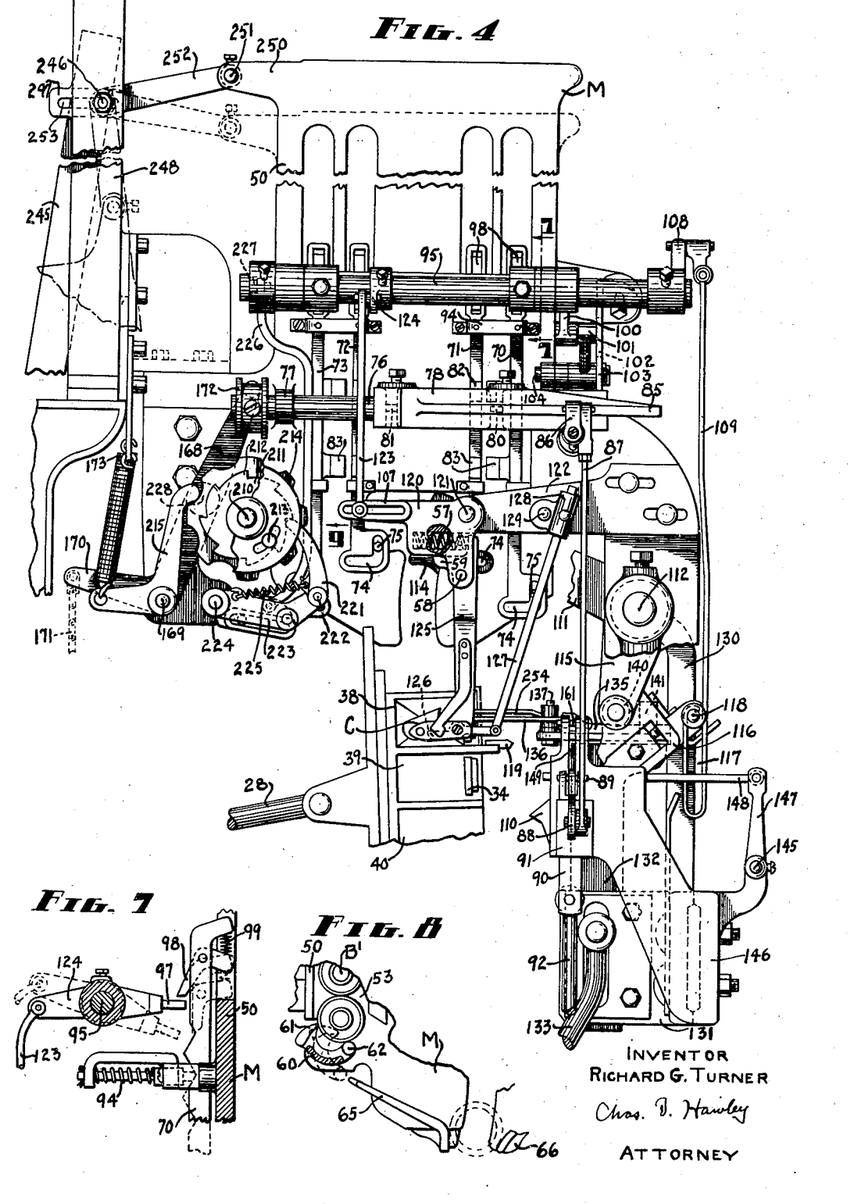
Fig. 4 is a detailed side elevation looking from the center of the loom in the direction of arrow 4, Fig. 3, showing the magazine and associated parts on an enlarged scale and in the 4 x 2 setting.
Fig. 7 is a fragmentary vertical section on line 7—7, Fig. 4, showing the details of one of the bobbin releasing vertical slides and the selector.
Fig. 8 is an enlarged view of a portion of Fig. 2 showing the lower left side of the magazine.

The heads of the reserve bobbins from the front pair of stacks will fall on a support 65 which extends downwardly and rearwardly, see Figs. 2 and 8, while the heads of the bobbins from the rear pair of stacks will fall on a support 66 inclined downwardly and forwardly. These two supports have their adjacent ends spaced to hold the head of a bobbin in transfer position and separate at the time of transfer to allow a bobbin resting on them to move downwardly out of the magazine. The front and rear supports 65 and 66 may be made as shown respectively in Brouwer Patent No. 1,652,604 and Ryon Patent No. 1,366,950. The tip of the bobbin in transfer position is supported by a pair of yieldable holders 67, one of which is shown in Fig. 3, made as set forth in Ryon Patent No. 1,563,592.

Cradle operating mechanism

The plate 50 has mounted thereon for vertical sliding a plurality of slides 70, 71, 72 and 73, see Figs. 3 and 4, which correspond, respectively, to the bobbin stacks or guides 53, 54, 55 and 56. Each vertical slide is provided with an L-shaped slot 74 at its lower end to receive an operating pin 75 formed as part of the associated cradle. These slides are all normally in their down position but when replenishment is initiated one or another of them will be raised to actuate the corresponding pin 75 and rock the associated cradle to the full line position of Fig. 8. The raised slide is subsequently depressed to give the cradle a reverse motion back to discharge its bobbin toward transfer position.

The mechanism for raising and lowering the vertical slides comprises a horizontal rod 76 slidable in bearings 77 on plate 50 and secured to a stack selector 78 from which project horizontally spaced fingers 80 and 81 adapted for engagement with upper and lower lugs 82 and 83, respectively, on the vertical slides. Fin 85 on selector 78 has sliding engagement with an arm 86 pivoted on rod 76 and connected to the upper end of a depending rod 87. The lower end of rod 87 is pivoted to the left end of a floating actuator lever 88 pivotally mounted at 89 to a block 90 reciprocating vertically in a fixed guide 91. Block 90 is connected to the upper end of a rod 92 the lower end of which is formed with the yieldable head 93, see Fig. 2.

By mechanism to be described hereinafter rod 87 is lowered to rock selector 78 in a counterclockwise direction as viewed in Fig. 3 when the shuttle in cell 38 is depleted of weft, thus causing one of the fingers 80 or 81 to raise one or another of the vertical slides, depending upon the longitudinal position of the stack selector. The fingers 80 and 81 are so spaced that they can cooperate with but one vertical slide at a time and the selector is ordinarily controlled as to horizontal position by mechanism to be described hereinafter. A spring plunger 94 cooperates with each vertical slide, see Fig. 7, to hold it either up or down, as shown in Chevrette Patent No. 1,510,765.

Transfer setting mechanism

Plate 50 has rockably mounted in the upper part thereof a transfer setting shaft 95 to which is secured a longitudinal shelf 97 parallel thereto for cooperation with dogs 98 one of which is pivoted to the upper end of each vertical slide, see Fig. 7. A small compression spring 99 located between the dog and its vertical slide moves the dog to the full line position shown in Fig. 7 over shelf 97 when the slide is up, but when the slide is down the dog is held in the dotted position of Fig. 7 by spring plunger 94 and in engagement with part of plate 50.

The forward end of shaft 95 has secured thereto an arm 100, see Fig. 3, carrying a small block 101 slidable in the slotted end 102 of a lever 103 pivoted to the plate 50 at 104. A compression spring 105 between block 101 and lever 103 acts as a yielding lock to hold shaft 95 and lever 103 in either of its two extreme angular positions. When lever 103 is in the position shown in Fig. 3 the block 101 is at the end of the slot in arm 102 to determine one extreme position of the shaft 95, but when the latter turns counterclockwise, an adjustable stop screw 106 on lever 103 engages part of plate 50 to determine the other extreme position of shaft 95 and lever 103.

Also secured to shaft 95 is a transfer controlling arm 108 connected to rod 109 which controls the transfer latch 110. The transferrer arm 111 pivoted on a stud 112 secured to the foot 113 of plate 50 has a heel 114 to engage the butt of the reserve bobbin being transferred. Pivoted to the transferrer arm at 115 is a holder 116 for latch 110.

The bottom of rod 109 is looped as at 117 to receive a stud 118 on latch holder 116. The latch 110 is normally down in non-transferring position below the path of a bunter 119 on the gang GR. When rod 109 is lowered latch 110 is raised to transfer position, and loop 117 permits rod 109 to rise while the latch is in engagement with the bunter.

Thread cutter

Bobbin changing magazines are usually provided with some form of weft thread cutter to sever the thread of the out-going bobbin and reset the top shaft 95 after transfer. In the present instance I use a thread cutter C including a bell crank lever 120 pivoted at 121 to a stand 122 on magazine foot 113. The horizontal arm 107 of lever 120 is connected to an upwardly extending rod 123 attached to arm 124 secured to shaft 95. Extending downwardly from and pivoted to lever 120 at 58 is a cutter arm 125 to which is pivoted a cutter blade 126 connected to a rod 127 the upper end of which is fixed to a head 128 pivoted on stud 129 held by stand 122. A heavy compression spring 57 pocketed in arm 107 acts to turn cutter arm 125 in a clockwise direction as viewed in Fig. 4. Finger 59 on arm 125 engages arm 107 to limit rearward motion of the cutter arm 125. The cutter serves its usual purpose and is described here as a means to reset the magazine and also because of its connection with a revoker to be described later.

The magazine may be generally of the form shown in Ryon Patent No. 1,030,748, while the thread cutter may be similar to that shown in Ryon Patent No. 1,633,648.

Weft detector

The weft detecting mechanism is shown more particularly in Figs. 2, 3, 4 and 5. A bracket 130 is secured to the transferrer arm stud 112 and has secured thereto a plate 131 which guides a vertically sliding detector carrier 132. The lower end of the carrier is pivoted to a rod 133 the bottom of which is attached to a collar 134 secured to the bottom of box lifter rod 42, see Fig. 1. The carrier, therefore, rises and falls with shuttle box gang GR.

Mounted on the carrier 132 is a horizontal slide 135 on the rear end of which is pivoted a side slipping detector finger 136 at 137. The finger moves angularly from the full to the dotted line position of Fig. 5 when in engagement with a substantially empty bobbin in the shuttle being detected. Rearward motion of the slide is limited by screw 138 on slide 135 which engages a stop 139 on the carrier. A roll 140 on the transferrer arm engages a lug 141 on slide 135 to move the latter forwardly on transferring beats of the loom.

A bar 142 depending from slide 135 engages a stud 143 on the upper end of an arm 144 secured to a small rock shaft 145 mounted on plate 146 bolted to bracket 130 and carrying the block guide 91. A second arm 147 secured to shaft 145 has pivoted thereto a controller pin 148 which extends rearwardly for longitudinal movement across a vertical slot 149 in part of plate 146 and in which moves the right hand end 150 of the previously described floating lever 88. The bar 142 is part of my invention but is described here to set forth the continuity of parts which transmit force from the feeler tip to controller pin 148. A spring 151 surrounds shaft 145 and has the left end thereof as viewed in Fig. 5 fixed with respect to the plate 146 while the other end is attached to a collar 152 secured to and angularly adjustable on shaft 145. This spring normally holds the controller pin 148 under lever 88 and serves also to hold the detector slide 135 yieldingly in rear position. The detector may be similar to that shown in Payne Patent No. 2,050,066.

When the detector finger 136 engages a sufficient supply of weft during advance motion of the lay it will push slide 135 and bar 142 forwardly, thereby rocking arm 147 forwardly, or to the left as viewed in Fig. 2, to move the controller pin from under the floating actuator lever 88. The latter is therefore free to move downwardly at the time of weft detection and rod 87 will remain substantially unmoved and the selector slide 78 will not be rocked. If the weft is exhausted, however, detector finger 136 will slide along the bobbin to the dotted position in Fig. 5, thus allowing slide 135 to remain in rear position and the controller pin 148 will remain under the floating lever. As the latter is moved downwardly rod 87 is depressed to rock the selector 78 in a counter-clockwise direction as viewed in Fig. 3 to raise one or another of the vertical slides.

Figure 5:
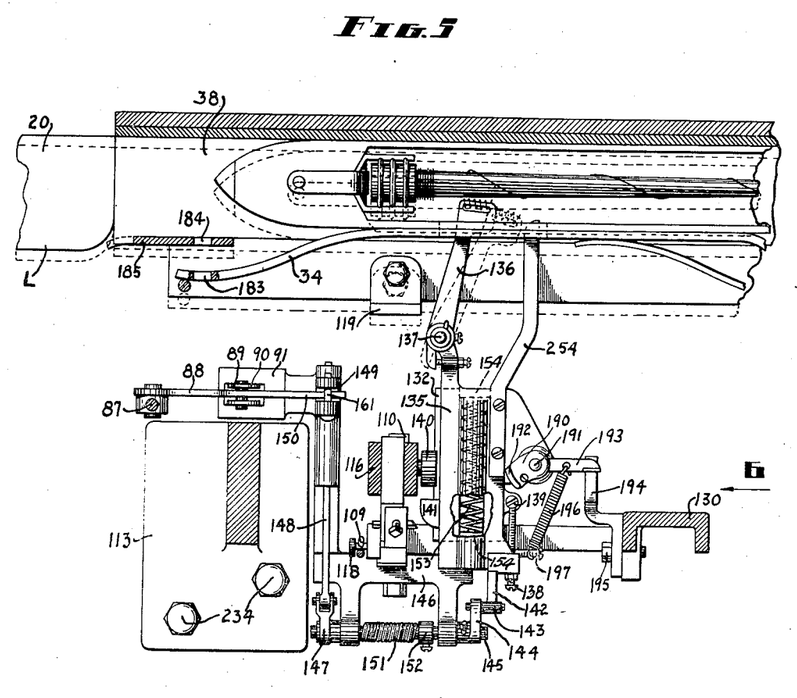
Fig. 5 is an enlarged horizontal section on line 5—5 of Fig. 2.

As shown in Fig. 5, a compression spring 153 acts on lugs 154 on the detector slide 135 and carrier 132 to hold the detector yieldingly in rearward position. This spring 153 is additional to spring 151 and may be similar to the corresponding spring shown in Payne Patent No. 2,050,066.

*Cam for 4 x 1 automatic*

The active shuttle must be picked to the opposite side of the loom on the first pick after a weft detecting operation and then be picked back on the next pick. While at the drop box end of the loom the exhausted shuttle may be moved out of active position in response to the control exercised by the pattern mechanism not shown, and the magazine must delay its release of a bobbin until the period for box shifting is complete, otherwise a bobbin might move to transfer position which did not correspond to the shuttle to be active on the second pick.

Figure 10:
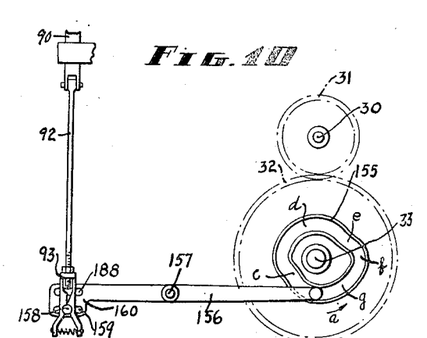

The cam 155 which cooperates with the weft detector and magazine when weaving 4 x 1 automatic is similar to those used heretofore and is secured to bottom shaft 33 to rotate in the direction of arrow a, Fig. 10, and rocks a lever 156 movable about a fixed pivot 157 on the loom frame. Head 93 on rod 92 engages a stud 158 adjustable horizontally in a slot 159 in the lower part of the forward end 160 of lever 156. In order to depress rod 92 when the lay is on front center on a detecting beat and give lever 88 a detecting stroke for possible cooperation with the controller pin, the cam is provided with a decline c which lowers lever 88 when the loom is near front center and the boxes GR are rising. After detection the cam 155 then rocks lever 156 back to normal position, where it is held by a dwell d until the end of the shifting period for the boxes GL. An incline e on the cam then raises rod 92 to cause the left end of lever 88 as viewed in Fig. 3 to elevate rod 87 for the purpose of rocking the selector to depress its fingers 80 and 81. End 150 of lever 88 is held against upward motion at this time by pin 161 in plate 146 extending across slot 149. If the active exhausted shuttle returns the previously raised vertical slide will now be depressed and a reserve shuttle will move toward transfer position. When high point f of cam 155 comes into action the rocking of selector slide 78 is completed, after which a decline g returns lever 156, block 90 and lever 88 to normal position, and the cam operation is completed.

It will be seen, therefore, that cam 155 has an active portion for each of the two picks constituting the two-pick cycle of the loom when the latter is operated 4 x 1 automatic and it will further be seen that the periods of activity are separated by an interval long enough to permit completion of the box shifting period of gang GL.

*Shift of selector 78, 4 x 1 setting*

When weaving 4 x 1 automatic there will be several shuttles having distinctive wefts and the reserve bobbins in the magazine will correspond to the wefts of these shuttles. In order to insure release of a bobbin of the same color as that carried by the exhausted shuttle the color slide is shifted horizontally by means of a lever 168 pivoted on a stud 169 fixed with respect to the magazine frame. Rearwardly extending arm 170 on lever 168 is connected to a chain 171 extending across the loom and connected by means not shown to the mechanism which shifts the box gang GL. The selector is caused to slide longitudinally to positions which correspond to the four vertical positions of the gang GL to cause correct registry between fingers 80 and 81 and the vertical slides by means of a grooved collar 172 secured to rod 76 maintaining driving connection with the lever 168 throughout the various longitudinal and angular motions of the selector. A spring 173 connected to lever 168 tends to move the selector forwardly while chain 171 moves the selector rearwardly. Chain 171 is disconnected from lever 168 when the 4 x 2 controller for the selector, to be described, is used.

*Operation of 4 x 1 setting*

The operation of the magazine in the 4 x 1 setting is thought to be evident from the foregoing description. When indicating weft exhaustion the detector effects raising of the vertical slide corresponding to the active shuttle and a reserve bobbin from its stack drops into the associated cradle. The exhausted shuttle is then picked to the opposite side of the loom and before its return the previously raised slide is depressed to move the selected bobbin to transfer position and raise the transferrer latch 110 into the path of the lay bunter 119 and also move the thread cutter C rearwardly. The transferrer arm is then lowered to place the fresh bobbin into the shuttle in box 38 and expel the exhausted bobbin downwardly through the box 39, which under these conditions will always be empty. The magazine will be reset during the latter part of the downward motion of the transferrer arm by forward motion of the thread cutter C caused by engagement thereof with the lay.

4 x 1 transfer revoker

In the usual automatic loom the shuttle binder at the magazine end must be short enough to allow room for the shuttle position detector, and ordinarily does not project beyond the inner tip of a properly boxed shuttle, but with the construction customarily used in drop boxes this condition does not exist and the binder, and also parts of the box, ordinarily extend toward the center of the loom two or three inches beyond the ends of the boxed shuttle.

Figures 9, 12, 13, 14, 17:
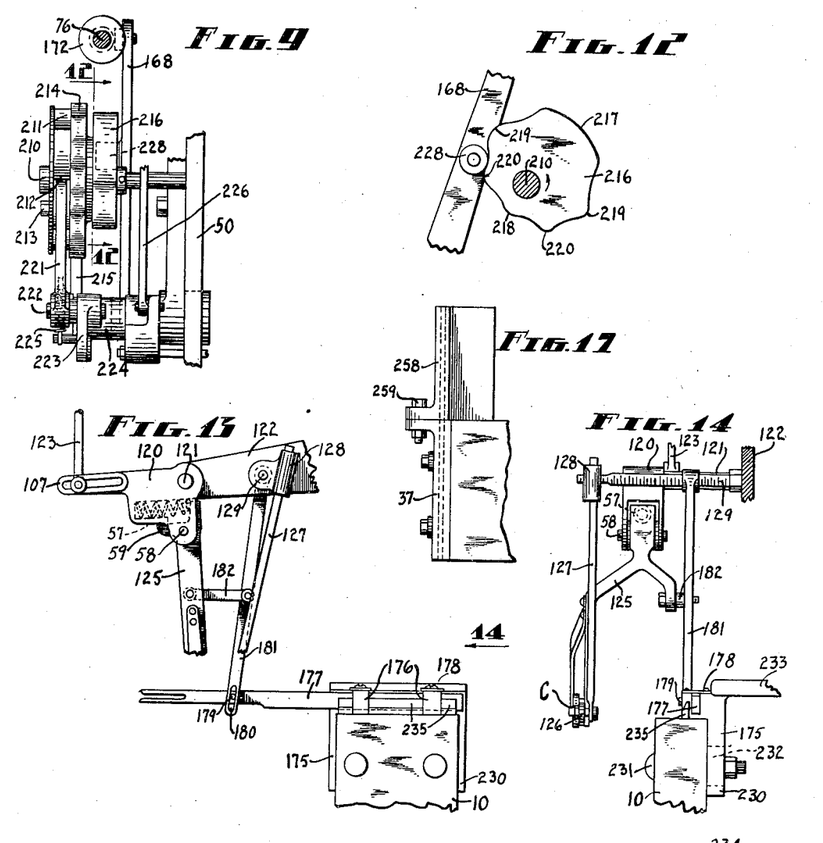
Fig. 9 is a detail front elevation of the selector controller for the 4 x 2 setting, looking in the direction of arrow 9.
Fig. 12 is a vertical section on line 12—12, Fig. 9.
Fig. 13 is a view similar to a portion of Fig. 4 but showing the details of the transfer revoking mechanism used with the 4 x 1 setting.
Fig. 14 is a front elevation of the structure shown in Fig. 13.
Fig. 17 is a detail end elevation in the direction of arrow 17, Fig. 1, showing the supplementary guide for the shuttle boxes in the 4 x 4 setting.

In order that an initiated transfer may be revoked should the shuttle be improperly placed I employ the mechanism shown in Fig. 13. The stand 175 for foot 113, used only with the 4 x 1 setting, is provided with a pair of spaced guides 176 in which slides a horizontal revoking bar 177 projecting rearwardly toward the lay. Caps 178 assist the guides 176 in causing the revoker bar to move in a substantially straight horizontal line. A pin 179 on the bar extends into a slot 180 on the lower end of an arm 181 the upper end of which is pivoted on stud 129. A link 182 pivoted to arm 181 extends rearwardly and is pivoted to the cutter arm 125. As shown in Fig. 5 the shuttle binder 34 for the upper cell 38 is slotted as at 183 and a corresponding slot 184 in register with it is formed in the front wall 185 of box 38, and these slots receive the rear end of revoker bar 177.

Under normal conditions when the thread cutter is forward link 182 holds bar 177 in forward position out of the path of the active shuttle. When the magazine is set for transfer, however, and the thread cutter is moved rearwardly, as already described, link 182 moves the bar 177 rearwardly across the path of the shuttle. If the shuttle is properly placed an initiated transfer is completed in the usual manner, but if the shuttle is not properly placed it will move the bar forwardly and act through link 182 and arm 125 to lower rod 123 to cause rocking of top shaft 95 in such a direction as to lift rod 109 and stud 118, thus depressing the transfer latch 110 before it can be engaged by the bunter 119 as the lay advances, thereby preventing transfer.

When weaving 4 x 1 automatic the drop boxes GR will always be in their lowest position so that top box 38 will be the only cell to receive the weaving shuttles. This condition can be brought about by building the pattern control so that it will maintain cell 38 in active position and also hold the weft detector permanently in low position.

4 x 2 general features

When the loom is to be converted from the 4 x 1 to 4 x 2 setting, the gang GR will be connected to the customary operating mechanism for the shuttle boxes so that it will be up for two picks and then down the next two picks. Under this arrangement the loom operates on a four-pick cycle and the shuttle boxes at one end of the loom will shift while the boxes at the opposite end are stationary for the purpose of always bringing a different shuttle to active position for each succeeding pick of the loom, thereby insuring a rotation of three or more weaving shuttles to mix wefts all of the same kind. The sequence of movement of boxes 38 and 39 under this arrangement will be substantially the same as those shown in my prior Patent No. 2,058,113, except that in the present instance boxes 38 and 39 are not separated by a blank box. When three weaving shuttles are used the repeat of shuttle box shiftings will be completed in twelve picks, and during the sequence each shuttle lays four separated single picks. Furthermore, each shuttle will return to box 38 every twelfth pick. The boxes GR will rise during a forward beat of the loom and will be half shifted when the lay reaches front center and will continue their upward shifting until the lay is in picking position approximately on top center. The boxes will then remain raised and stationary with respect to the lay for approximately a pick and a half, after which they will shift downwardly. During each four-pick cycle, therefore, the boxes GR shift up during half a pick, remain up during a pick and a half, shift down during half a pick, and remain down for a pick and a half to conclude the cycle.

In order to adapt the magazine already described for 4 x 2 automatic operation provision must be made to fit the two-pick cycle of the magazine controlling mechanisms into the four-pick cycle of shuttle box motions in such a way that the magazine will never be able to initiate and complete a transfer when the gang GR is down, and it is further necessary to initiate and complete transfer during that part of the four-pick cycle in which the exhausted shuttle is inactive in cell 38. Furthermore, provision must be made for permitting the weft detector to control the position of the controller pin even though the detector rises and falls with cell 38, and the magazine must be held in high position to clear cell 38 when the latter is up.

4 x 2 automatic pick and pick

With the gang GR connected to its actuating mechanism to rise and fall as described, box 38 will start up immediately after receiving one of the weaving shuttles and will be moved forwardly toward the weft detector by the lay. The detector rises with gang GR and remains aligned with cell 38 because of rod 133. If the detector engages a fully supply of weft it will move forwardly and cause the bar 142 to move arm 144 forwardly, thereby moving the controller pin from under the actuator lever 88. Bar 142 is long enough to exercise this control during the up motion of the detector. If weft exhaustion is indicated, however, the bar 142 will remain substantially unchanged, sliding upwardly relatively to arm 144, and the unmoved controller pin will cause rocking of the selector to raise one or another of the vertical slides, as is the case with 4 x 1 setting.

Upward motion of the vertical slide will be completed shortly after the loom has passed front center position and while the shuttle boxes are still rising. The ensuing transfer must take place while the boxes are still raised and since the cycle of the loom is such that there will be but one more front center position of the lay before the gang GR starts down, the selector slide must act sooner after indication of weft exhaustion to depress the raised vertical slide than was the case with the 4 x 1 setting. This earlier lowering of the vertical slide is not interfered with by the shifting of gang GL, since the latter is not connected to the selector in the 4 x 2 setting.

Cam for 4 x 2 setting

Figure 11:
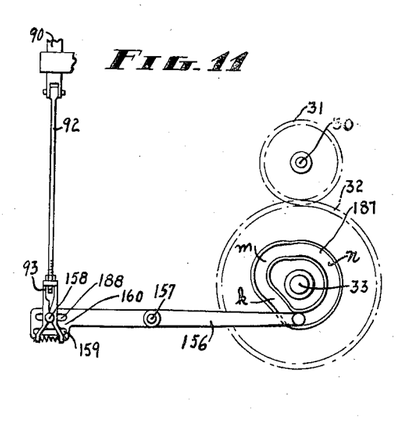

Fig. 11 shows the cam 187 used with the 4 x 2 setting and effects the aforesaid earlier lowering of the vertical slides. This cam, like cam 155, completes a rotation in two successive picks, but since replenishment must be initiated and completed substantially within one pick of the loom, the active part of cam 187 will all lie on one side of a diameter.

Cam 187 has a decline $k$ similar to decline $c$ of cam 155 to lower block 90 when the detector engages the weft in rising box 38. The decline $k$ leads immediately to a high point $m$ without an intermediate dwell and thus effects a quick reversal of the selector to depress a raised vertical slide and release a reserve bobbin by the time the lay reaches back center. High point $m$ then leads to a long intermediate dwell $n$ which holds lever 156 stationary for approximately a whole pick of the loom. The released bobbin thus has time to come to rest in transfer position before the transferrer arm starts down, and the transfer operation takes place while dwell $n$ is holding the selector from turning on its axis.

Since the magazine is in high position, the stud 158 will be in the upper slot 188 in lever 156. Slot 188 is above slot 159 by a distance substantially equal to that through which the magazine is raised to convert it from the 4 x 1 to the 4 x 2 setting.

Locking of weft detector 4 x 2 setting

The cam 187 will again move lever 156 when the boxes GR move down to render cell 38 active and the detector could therefore start a replenishing operation unless prevented from doing so. In order to prevent indication of exhaustion at this time I provide a lock 190, see Fig. 5, pivoted at 191 to the vertically reciprocating detector slide 132 and having a shoe 192 slightly eccentric with respect to the center 191. A laterally extending arm 193 rigid with the shoe bears against a cam 194 bolted at 195 to the bracket 130. A light tension spring 196 between arm 193 and a fixed part 197 of carrier 132 holds arm 193 against the cam and also tends to move the shoe into frictional holding engagement with the side of detector slide 135. Cam 194 is shown more particularly in Fig. 6 and has a downwardly and rearwardly inclined surface 198 along which the arm 193 slides during vertical shifting of the weft detector.

The weft detector will have been moved to a forward position before it starts down with the box 38, either by engagement with a sufficient supply of weft to prevent slipping of the detector finger, or by engagement of roll 140 with lug 141 on detector slide 135. The upper part of surface 198 permits the lock to hold the detector forwardly when the detector is in high position independently of the lay position.

During the first part of the downward motion of the boxes GR occurring when the lay is forward the shuttle in box 38 will approach the detector but the latter is still held forwardly by the lock and cannot indicate weft exhaustion. Arm 193 moves rearwardly and downwardly along surface 198 but does not move the shoe sufficiently to unlock the detector until the lay has moved rearwardly to a point where the bobbin is out of reach of the detector finger when the latter is finally released. In this way the detector is prevented from striking the bobbin in descending box 38 on that pick of the loom when the active part of cam 187 is giving lever 88 a detecting stroke. The lock, therefore, serves the purpose of enabling the two-pick cycle cam 187 to be used with the four-pick cycle box shift at the magazine end with assurance that no replenishing operation will be initiated on that half of the four-pick cycle when the box 38 is down.

Dwell on 4 x 2 cam

Occasionally the remaining weft on the bobbin may not slip on its first engagement with the detector as boxes GR rise but will slip on the second engagement when the lay again beats up. Should this happen and should the lock simultaneously fail, the dwell $n$ of cam 187 will hold the actuator lever 88 stationary during the second beat-up and will prevent the slipping of the detector from becoming an indication of weft exhaustion and transfer will not be initiated. This control exercised by dwell $n$ is also useful when the boxes are fully down on the last of the four picks of the cycle, and even though the detector finger should slip on this last beat the dwell $n$ will prevent communication of the indication to the magazine.

In the four-pick cycle, therefore, it is seen that the detector is free to initiate transfer on the first of the four picks when the boxes are rising, but will be prevented from communicating an indication to the magazine during the second and fourth picks by reason of the dwell $n$ and will be locked by shoe 192 during the third pick until after the lay has moved rearwardly too far to permit engagement of the detector finger with the weft in the descending box 38.

4 x 2 bobbin selector

When weaving 4 x 2 automatic it is desirable to mix the bobbins at the magazine as well as in the weaving shuttles so that the uniformity in the resultant fabric will be due not only to the rotation of the weaving shuttles but also to the fact that the bobbins are drawn in rotation from the different stacks of the magazine, and in order that this rotation at the magazine may be effected I employ a control for the selector slide such as shown in Figs. 4, 9 and 12. A fixed stud 210 on plate 50 has rotatably mounted on it a ratchet wheel 211 having eight teeth 212. The ratchet is bolted as at 213 to a lock wheel 214 having eight notches to cooperate with a yielding lock lever 215. Pinned to the lock wheel is a selector cam 216 having high and low areas 217 and 218, respectively, see Fig. 12, corresponding each to two successive teeth of the ratchet wheel, and intermediate areas 219 adjacent the high area and 220 adjacent the low area, corresponding each to a tooth of the ratchet wheel.

An operating pawl 221 for the ratchet is pivoted at 222 to an arm 223 which moves about a fixed stud 224 on the magazine frame, and a spring 225 holds the pawl yieldingly against the ratchet. A rod 226 connects lever 223 to an arm 227 fixed to the top shaft 95. A roll 228 on arm 168 is held by spring 173 in engagement with the cam and as the latter rotates the selector is moved longitudinally to different positions depending upon which area of the cam engages the roll.

When the top shaft 95 is rocked in a right hand direction as viewed in Fig. 3, rod 226 will depress arm 223 to lower pawl 221 into position for engaging the next ratchet tooth. As the shaft 95 is given a reverse motion upon resetting of the magazine the rod 226 will lift the pawl to rock the ratchet, the lock plate, and the selector cam one-eighth of a rotation, thereby changing the position of the cam and roll 226 to shift the selector laterally with respect to the vertical slides of the magazine either by the cam or spring 173. Should the roll 228 be on the first part of either the high or low areas of the cam there will be no shift of the selector. In this way most of the successive transfers involve bobbins derived from different vertical stacks and there is a mixing with respect to the stacks of origin in the magazine as the bobbins are selected for transfer. The lever 223 may be used in connection with a bobbin release employed with the 4 x 1 setting of the magazine not shown herein but set forth in Patent No. 1,307,024 to Ryon.

It should be noted that the cam 216 turns to shift the selector while dwell n of cam 187 holds the lever 88 in intermediate position with fingers 80 and 81 of the selector free to move longitudinally without interfering with lugs 82 and 83 of the vertical slides. When weaving 4 x 1 pawl 221 will be disconnected from the ratchet wheel, and low dwell 218 is moved to engage roll 228 on lever 168.

*4 x 2 shuttle position detector*

In the 4 x 2 setting it is important to prevent transfer if the shuttle is improperly positioned and I accomplish this result by a shuttle feeler finger 254 secured to the slide 135 and projecting rearwardly and spaced laterally far enough from the detector finger 136 to permit lateral indicating motion thereof, see Fig. 5. If the shuttle in cell 38 is improperly positioned as the boxes GR rise it will push finger 254 and the feeler slide forwardly, thereby moving the controller pin 148 from under the lever 88 to prevent initiation of transfer. If the shuttle is correctly placed, finger 254 has no effect and indication of weft exhaustion and transfer can occur as previously described.

*Magazine mounting*

Figure 15:
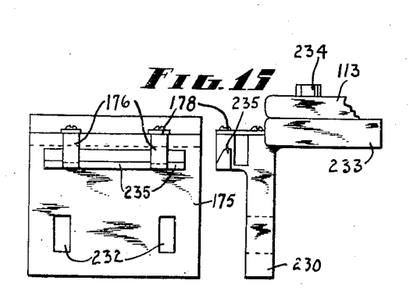
Fig. 15 is a collective side and front elevation of the magazine support for the 4 x 1 setting.
Figure 16:
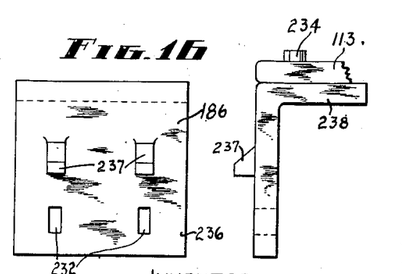
Fig. 16 is similar to Fig. 15 but for the 4 x 2 setting.

In each of its two vertical positions the magazine must be properly aligned with respect to and at the same distance from box 38 when transfer occurs. The primary magazine supports 175 and 168 shown in Figs. 15 and 16 are for the magazine foot 113 in the 4 x 1 and 4 x 2 settings, respectively. Stand 175 has a vertical web 230 to be held to the adjacent loomside by bolts 231 in slots 232 in the web. A horizontal plate 233 projects laterally from web 230 to support foot 113 to which it is held by bolts 234. A lug 235 on web 230 overlies the loomside and vertically positions plate 233 and therefore the magazine. If desired, however, guides 176 can support stand 175 in the 4 x 1 setting. The other support 186 has a web 236 which can be held to the loomside by bolts 231 passing through slots 232, and has also lugs 237 similar to lug 235. The lateral plate 238 of web 236, however, is higher than plate 233 relatively to the lugs by an amount equal to the vertical distance between the box cells 38 and 39. These two supports are interchangeable on the loom and are preferably held to the loomside and the magazine foot by the same bolts, whether the setting be 4 x 1 or 4 x 2. Support 186 is not provided with guides 176 and there is no chance that the revoker bar 177 will be used with the 4 x 2 setting.

The upper part of the magazine is held in a manner somewhat similar to that set forth in Verry Patent No. 2,102,864. Extending upwardly from fixed structure on the loom is an angle bar 245 to the upper end of which is bolted the outer end of a rod 246. The inner end of this rod is held to a lug 247 on the arch 248 of the loom frame. Extending rearwardly from the end plate 50 and 51 of the magazine are horns 250 connected by a rod 251, and links 252 connect rods 246 and 251. The rod 251 can assume either of two vertical positions depending upon which of the supports 175 or 186 is used, and the rod 246 is so placed that when the magazine is in high position links 252 will be inclined downwardly toward the rear, but when the magazine is in low position the links will be inclined upwardly and rearwardly. By having bar 246 located approximately half way between the high and low positions which can be assumed by the rod 251 very little if any adjustment is required when shifting from one to the other of the automatic settings of the magazine. The lug 247 is provided with a horizontal slot 253 which permits a slight horizontal adjustment of the rod 246, however, should slight adjustment be needed.

*4 x 4 non-automatic setting*

Thus far the description has been concerned with the operation of the loom either as a 4 x 1 or 4 x 2 automatic, but the loom can also be used for 4 x 4 non-automatic weaving. When this third setting is employed the magazine is disconnected from its supporting foot, slid outwardly on rod 246, and swung upwardly and backwardly around rod 246 to the non-operative position shown in dot and dash lines in Figs. 1 and 3, much in the manner set forth in the previously mentioned Verry patent. When so placed the magazine will rest on an arm 255 on upright 245 and be held high enough to be out of the path of shifting of gang GR in the 4 x 4 setting. The detector swings rearwardly along with the magazine and rod 133 will be disconnected from the box lifter rod. The exhausted bobbin chute 256 is removed and the gang GR connected to the box motion so that any one of the four cells 38, 39, 40 and 41 can become active.

*Outer guide for gang GR*

The weft ends which extend from the reserve bobbins in the magazine are ordinarily held by a thread holder 257 and lie a short distance above the lay. When the loom is weaving automatically the outer box guide 37 has a short upper end which swings back and forth with the lay under the threads without engaging them. When the loom is used for non-automatic 4 x 4 weaving the guide 37 is not high enough and I add an extra guide 258 which is held to guide 37 by bolts 259, see dotted lines of Fig. 1 and Fig. 17. In non-automatic weaving there will be no weft ends and the extra guide 258 can be used to provide the four cells of a gang GR with a sufficiently long outer guide.

*Summary*

From the foregoing it will be seen that I have provided a loom which with slight adjustments can be adapted either for weaving 4 x 1 automatic with diversity of colors in the weaving shuttle and magazine, or pick and pick filling mixing automatic wherein weaving shuttles all carry the same character of weft and wherein the magazine by reason of the selector cam effects a mixing of the bobbins as they are drawn from the several stacks in the magazine. It will also be seen that provision is made for mounting the magazine in two different vertical positions by means of the supports 175 and 186, the difference in vertical height of the magazine in these two settings being equal substantially to the difference in the centers of the cells 38 and 39 in the gang GR. It will further be noted that provision is made for revoking an initiating transfer with the 4 x 1 setting by means of mechanism which is mounted on the support 175 but which cannot be mounted on the support 186.

Furthermore, it will be seen that the lock for the detector shown in Fig. 5, together with the long dwell in the 4 x 2 cam 187 permits the detector to initiate transfer on the first pick only of the four-pick cycle employed when weaving 4 x 2 automatic, despite the fact that the cam 187 is on a shaft which has a complete rotation in two picks. The lever 156 is used for both automatic settings and has provision for connection with the rod 92 at two different elevations depending upon the vertical setting of the magazine. The magazine and the detector together with the actuator lever 88 and the controller pin move as a unit because of the bracket 130 and those parts which initiate and also complete a transferring operation move the unit except the bunter 119, which however is determined as to position by the gang GR when weaving 4 x 2.

Having thus described my invention it will be seen that changes and modifications may be made therein by those skilled in the art without departing from the spirit and scope of the invention and I do not wish to be limited to the details herein disclosed, but what I claim is:

1. In a weft replenishing loom having a reserve bobbin magazine to be located either in high or low position for effecting a transfer operation with respect to a shuttle box which can be located either in high or low position with respect to the loom lay, a weft detector to be located either in high or low position and capable in either position of indicating exhaustion of weft in the shuttle box when the latter is in corresponding position, bobbin release mechanism on the magazine movable therewith either to high or low position, an actuator for the release mechanism movable with the magazine either to high or low position, means to cause the actuator to operate the release mechanism to release a bobbin when the actuator has an operating stroke and the detector indicates weft exhaustion, an operating mechanism for the actuator having an operating movement in a given range of motion whether the magazine be in high or low position, and means to connect the actuator to the operating mechanism in relatively high position with respect to the latter when the magazine is in high position and connect the actuator to the operating mechanism in relatively low position with respect to the latter when the magazine is in low position to cause the actuator to have an operating stroke when the operating mechanism has an operating movement, thus permitting the use of the same operating mechanism whether the magazine be in high or low position.

2. In a weft replenishing loom having a lay and a shuttle box capable of connection to the lay either in high or low position, weft replenishing mechanism to be mounted in high position to replenish the shuttle box when the latter is in high position, said replenishing mechanism to be mounted in low position for replenishment of the shuttle box when the latter is in low position, said weft replenishing mechanism including an actuator member having a range of motion between vertically spaced limits which are fixed with respect to the replenishing mechanism, an operating member for the actuator having a range of motion between vertically spaced limits which are fixed with respect to the loom and remain the same whether the replenishing mechanism is in high or low position, and connections between the operating member and the actuator adjustable with respect to at least one of said members to connect said members in two different vertically spaced relationships, one for the replenishing mechanism in high position and another for the replenishing mechanism in low position, thus permitting the same operating member to be used whether the replenishing mechanism be in high or low position.

3. In supporting structure for the reserve bobbin magazine of a weft replenishing loom having a lay to hold a shuttle box either in low active position or in high inactive position, the loom having provision for supporting the magazine in low or high position to effect replenishing operations with respect to the shuttle box in low active or high inactive position, respectively, a magazine supporting member on the loom frame adjacent to the upper part of the magazine, and connections between and movable relatively to the member and magazine to assist in holding the magazine in proper position for a replenishing operation whether the magazine be in low or high position.

4. In supporting structure for the reserve bobbin magazine of a weft replenishing loom having a lay to hold a shuttle box at two levels, either in low active position or in high inactive position, the loom having provision for supporting the magazine at two levels, either in low or high position to effect replenishing operations with respect to the shuttle box in low or high position, respectively, a supporting member on the loom frame extending substantially parallel to the lay and adjacent to the upper part of the magazine, and means pivoted to the member and magazine to swing relatively to the member when the magazine is moved from one level to the other level and assist in holding the magazine in proper position for a replenishing operation at either level.

5. In supporting structure for the magazine of a weft replenishing loom having a lay to hold a shuttle box at two levels, either in low active position or in high inactive position; the loom having provision for supporting the magazine at two levels, either in low position or high position to effect replenishing operations with respect to the shuttle box at the corresponding level, a member secured to the loom frame and extending substantially parallel to the lay adjacent to the upper part of the magazine, attaching means for the magazine pivoted on said member, and pivotal connections between said means and the magazine to connect the latter to the member and assist in holding the magazine in proper position for a weft replenishing operation at either level, said pivotal connections to be as far below said member when a magazine is in low position as they are above said member when the magazine is in high position.

RICHARD G. TURNER.